(12) United States Patent (10) Patent No.: US 9,071,678 B2
Yang et al. (45) Date of Patent: *Jun. 30, 2015

(54) INTELLIGENT LOOP DIAGNOSTICS FOR DIGITAL SUBSCRIBER LINE SERVICES TO SUPPORT A SERVICE ASSURANCE SYSTEM

(71) Applicant: AT&T Intellectual Property I, LP, Atlanta, GA (US)

(72) Inventors: Chen-Yui Yang, Marlboro, NJ (US); Paritosh Bajpay, Edison, NJ (US); David H. Lu, Morganville, NJ (US); Raghvendra Savoor, Walnut Creek, CA (US); Anthony M. Srdar, Alpharetta, GA (US); Jin Wang, Fremont, CA (US); Xidong Wu, Livermore, CA (US); Xiaochuan Yi, Danville, CA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 221 days.

This patent is subject to a terminal disclaimer.

(21) Appl. No.: 13/785,292

(22) Filed: Mar. 5, 2013

(65) Prior Publication Data

US 2013/0272142 A1    Oct. 17, 2013

Related U.S. Application Data

(63) Continuation of application No. 12/854,667, filed on Aug. 11, 2010, now Pat. No. 8,416,700.

(51) Int. Cl.
*H04L 1/12*     (2006.01)
*H04M 3/22*     (2006.01)
*H04B 3/46*     (2015.01)
*H04L 12/28*    (2006.01)

(Continued)

(52) U.S. Cl.
CPC .............. *H04M 3/2254* (2013.01); *H04B 3/46* (2013.01); *H04L 12/2878* (2013.01); *H04M 3/306* (2013.01); *H04M 11/062* (2013.01); *H04N 17/004* (2013.01)

(58) Field of Classification Search
CPC ... H04M 1/24; H04M 3/2209; H04M 3/2254; H04M 3/30; H04M 3/301; H04M 3/305; H04M 3/306; H04M 11/062; H04B 3/46; H04L 12/2878; H04N 17/004
USPC ............ 370/249; 379/22.01–22.03, 27.01–31
See application file for complete search history.

(56) References Cited

U.S. PATENT DOCUMENTS 7,010,441 B2    3/2006    Galli
7,027,589 B2    4/2006    Shi (Continued)

*Primary Examiner* — Pao Sinkantarakorn
(74) *Attorney, Agent, or Firm* — Guntin & Gust, PLC; Douglas Schnabel

(57) ABSTRACT

A method of diagnosing a transmission loop in an Internet protocol television (IPTV) network includes configuring the loop as an open loop and performing a single-ended loop test (SELT), configuring the loop as a terminated-loop and performing another SELT, subtracting a trace of the first SELT from a trace of the second SELT, and determining the length of the loop from the result. A service assurance system in an IPTV network includes a test module and a DSLAM coupled to a residential gateway by a transmission loop. The test module operates to determine that a fault condition on the IPTV network is caused by a fault in the loop, direct the DSLAM to perform an open loop SELT and a terminated-loop SELT on the loop, receive the results of the SELTs, and determine a location of a tap on the loop based upon the results.

17 Claims, 9 Drawing Sheets

(51) Int. Cl.
  *H04M 3/30* (2006.01)
  *H04N 17/00* (2006.01)
  *H04M 11/06* (2006.01)

(56) References Cited

U.S. PATENT DOCUMENTS

| | | | |
|---|---|---|---|
| 7,460,649 B2 | 12/2008 | Ouyang | |
| 7,532,011 B2 | 5/2009 | Shi | |
| 2006/0120442 A1* | 6/2006 | Melsa et al. | 375/222 |
| 2008/0089485 A1 | 4/2008 | Duvaunt | |
| 2008/0240368 A1 | 10/2008 | Duvaunt | |
| 2008/0279269 A1 | 11/2008 | Duvaut | |
| 2008/0298555 A1 | 12/2008 | Duvaunt | |
| 2009/0310755 A1 | 12/2009 | Dinesh | |
| 2009/0323902 A1 | 12/2009 | Dinesh et al. | |
| 2010/0086105 A1 | 4/2010 | Dinesh | |

* cited by examiner

Subtracting Open-Loop from Closed-Loop Yields Loop-Length

Clean Loop

Long Bridged Tap Confirmed by DELT Test

Short Bridged Tap Confirmed by DELT Test

Open Fault (Flat Drop or Bad Splice)

Bad Cable (Multiple Reflection Points)

AM Radio Interference

INTELLIGENT LOOP DIAGNOSTICS FOR DIGITAL SUBSCRIBER LINE SERVICES TO SUPPORT A SERVICE ASSURANCE SYSTEM

CROSS-REFERENCE TO RELATED APPLICATIONS

This application is a continuation of U.S. patent application Ser. No. 12/854,667 filed Aug. 11, 2010 which is incorporated herein by reference in its entirety.

FIELD OF THE DISCLOSURE

The present disclosure generally relates to an Internet protocol television system, and more particularly relates to intelligent loop diagnostics for very-high bit-rate digital subscriber line services to support service assurance systems on an Internet protocol television system.

BACKGROUND OF THE DISCLOSURE

An Internet protocol television (IPTV) service provider can transmit an IPTV signal to a user of the IPTV system via a central office, a serving area interface, and a residential gateway (RG). The IPTV service provider can offer the user a variety of different content and services. For example, the IPTV service provider can supply users with real-time television programs that are typically available for the users to watch only at a specific date and time. The IPTV service providers can also offer the users on-demand movies that are available for an extended amount of time and that are provided to the users upon request. The user can also record audio or video content for storage in a digital format on the user's set-top box or on a data server on the IPTV system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
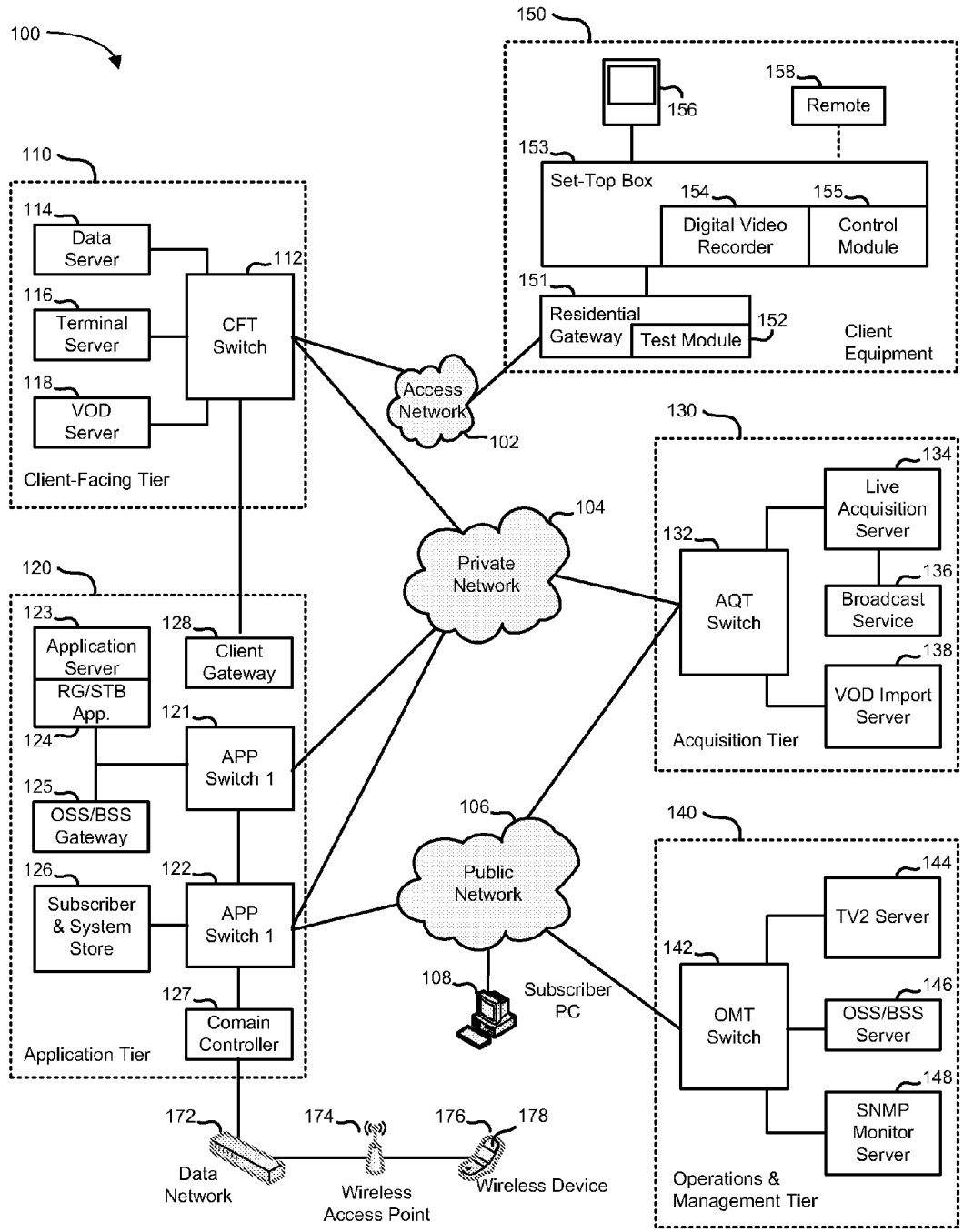
FIG. 1 is a block diagram illustrating an embodiment of an IPTV system.

FIG. 1 illustrates an embodiment of an IPTV system 100 including a client facing (CF) tier 110, an application tier 120, an acquisition tier 130, an operations and management (OM) tier 140, and one or more sets of customer premises equipment (CPE) 150. IPTV system 100 includes an access network 102, a private network 104, and a public network 106. Each tier 110, 120, 130, and 140 is coupled to one or more of access network 102, private network 104, and public network 106. In a particular embodiment, CF tier 110 is coupled to access network 102 and to private network 104, application tier 120 is coupled to private network 104 and to public network 106, acquisition tier 130 is coupled to private network 104 and to public network 106, OM tier 140 is coupled to public network 106, and CPE 150 is coupled to access network 102. CPE 150 is typically located at the home or business premises of a subscriber to IPTV system 100.

Networks 102, 104 and 106 communicate information between tiers 110, 120, 130, and 140, and CPE 150. Access network 102 communicates information between CF tier 110 and CPE 150. Private network 104 communicates information between CF tier 110 and application tier 120, between application tier 120 and acquisition tier 130, and between acquisition tier 130 and CF tier 110. Public network 106 communicates information between application tier 120 and acquisition tier 130, between acquisition tier 130 and OM tier 140, and between OM tier 140 and application tier 120. Information is also communicated directly between CF tier 110 and application tier 120, as described below. The information communicated between tiers 110, 120, 130, and 140, and CPE 150 includes encoded television programs, audio files, data files, commands, procedures, other information, or a combination thereof.

CF tier 110 communicates with multiple sets of CPE 150 over a wide geographic area, such as a regional area, a metropolitan area, a viewing area, or any other suitable geographic area that is supported by access network 102. CPE 150 includes a residential gateway (RG) 151, a set-top box 153, a display device 156, and a remote control 158. RG 151 includes a test module 152. Set-top box 153 includes a digital video recorder (DVR) 154 and a control module 155. RG 151 is coupled to access network 102, and translates information from a form suitable for transmission over access network 102 to a form suitable for use by set-top box 153, and vice versa. In a non-limiting example, RG 151 is coupled to access network 102 via fiber-optic cables, a very-high bit-rate digital subscriber line (VDSL), another network fabric, or a combination thereof.

The information that CF tier 110 communicates to RG 151 is sent to set-top box 153, which processes the information into a form suitable for display by display device 156 or for recording by DVR 154. Set-top box 153 receives digitally encoded content from CF tier 110 for display on display device 156, or for recording by DVR 154. A non-limiting example of digitally encoded content includes television programs, video-on-demand (VOD) content, audio and video content, other data, or a combination thereof. Set-top box 153 can also receive data from CF tier 110, and render or display the data on display device 156. Further, set-top box 153 can send data to CF tier 110. Such data can include service requests, or commands from the subscriber received by set-top box 151 via remote control 158. In this way, the subscriber can request services or information or respond to a request for information from IPTV system 100. A non-limiting example of data received by or sent from set-top box 153 includes audio or video files, data files, commands, procedures, other data, or a combination thereof, and can be formatted as transmission control protocol/internet protocol (TCP/IP) data. Control module 155 includes instructions that are executable by set-top box 153 to control the data flow between the subscriber and IPTV system 100. Control module 155 can include an IPTV software platform such as Microsoft® TV IPTV Edition.

Control module 155 can facilitate data communication between set-top box 153 and IPTV system 100. For example, control module 155 can include a procedure whereby set-top box 153 receives a request to record content on DVR 154, or sends a status to IPTV system 100 that the content has been recorded. Likewise, control module 155 can include a procedure whereby the subscriber can interact with IPTV system 100 to receive and execute a viewing preference that the subscriber has created in IPTV system 100. Such preferences can be created via remote control 158, or through a subscriber account that is accessible through public network 106, such as through a subscriber's personal computer 108. A non-limiting example of remote control 158 includes a hand-held controller device, a game controller device, a keyboard/mouse device, another control device, or a combination thereof.

CF tier 110 includes a client-facing tier (CFT) switch 112, a data server 114, a terminal server 116, and a VOD server 118. CFT switch 112 manages communication with CPE 150 through access network 102 and with application tier 120 and acquisition tier 130 through private network 104. CFT switch 112 is coupled to data server 114 that stores data transmitted in response to subscriber requests. CFT switch 112 is also coupled to terminal server 116 that provides terminal devices, such as a game application server, or other devices with a common connection point to private network 104. CFT switch 112 is also coupled to VOD server 118.

Application tier 120 includes application tier (APP) switches 121 and 122, an application server 123, an operation systems and support/billing systems and support (OSS/BSS) server 125, a subscriber and system store 126, a domain controller 127, and a client gateway 128. APP switches 121 and 122 manage communication with CF tier 110 and acquisition tier 130 through private network 104. APP switch 122 also manages communication with acquisition tier 130 and OM tier 140 through public network 106. APP switch 121 is coupled to APP switch 122. APP switch 121 is also coupled to application server 123 and to OSS/BSS gateway 125. Application server 123 provides applications for IPTV system 100. Application server 123 includes an RG/STB application 124 that provides functions to set-top box 153 as recording and displaying content, messaging, and processing of IPTV data and VOD material. RG/STB application 124 also provides functions to RG 151 to direct test module 152 into various diagnostic test modes and to receive results from the diagnostic tests. OSS/BSS gateway 125 includes operation systems and support (OSS) data, and billing systems and support (BSS) data.

APP switch 122 is coupled to domain controller 127 and to subscriber and system store 126. Domain controller 127 provides web access, for example, to subscribers via public network 106. Subscriber and system store 126 includes account information that is associated with subscribers who access IPTV system 100 via private network 104 or public network 106. Application tier 120 also communicates data directly to CF tier 110 through client gateway 128. In this embodiment, client gateway 128 is coupled directly to CFT switch 112.

Client gateway 128 provides subscriber access to private network 104 and tiers coupled thereto. In particular, set-top box 153 accesses IPTV system 100 via access network 102 using information received from client gateway 128. Access network 102 provides security for private network 104. CPE 150 accesses client gateway 128 via access network 102, and client gateway 128 allows CPE 150 to access private network 104 once CPE 150 is authenticated or verified. Similarly, client gateway 128 prevents unauthorized CPE (not illustrated), such as hacker computers or stolen set-top box devices, from accessing private network 104 by denying access to these devices beyond access network 102.

For example, when set-top box device 153 accesses IPTV system 100 via access network 102, client gateway 128 verifies subscriber information by communicating with subscriber and system store 126 via private network 104, APP switch 121, and APP switch 122. Further, client gateway 128 verifies billing information and status by communicating with OSS/BSS gateway 125 via private network 104 and APP switch 121. OSS/BSS gateway 125 transmits a query across APP switch 121, to APP switch 122, and APP switch 122 communicates the query across public network 106 to an OSS/BSS server 146 (described below). After the client gateway 128 confirms subscriber and/or billing information, client gateway 128 allows set-top box device 153 access to IPTV system 100 content and VOD server 118 content. If client gateway 128 cannot verify subscriber information for set-top box 153, such as when set-top box 153 is connected to a different twisted pair, or when set-top box 153 is stolen, client gateway 128 denies transmissions to and from set-top box device 153 beyond access network 102.

Domain controller 127 communicates with public network 106 via APP switch 122. Domain controller 127 includes a web portal that allows a subscriber to access IPTV system 100 using a personal computer 108. Domain controller 127 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or a combination thereof. Wireless device 176 includes a display device 178 for displaying information from IPTV system 100. Display device 178 includes a text display, a picture display, a video display or a combination thereof.

Acquisition tier 130 includes an acquisition tier (AQT) switch 132, a live acquisition server 134, a broadcast service 136, and a video-on-demand importer server 138. AQT switch 132 manages communication with CF tier 110 and application tier 120 through private network 104, and with application tier 120 and OM tier 140 through public network 106. AQT switch 132 is coupled to live acquisition server 134, and video-on-demand importer server 138. Live acquisition server 134 acquires television content from broadcast service 136. Live acquisition server 134 sends the television content to AQT switch 132 for transmission to CF tier 110 via private network 104. The television content is further encoded at data server 114, and sent to CPE 150 via access network 102. Set-top box 153 receives the television content from RG 151, decodes the television content, and transmits the information to display device 156 according to commands from remote control device 154.

Additionally, VOD importer server 138 receives content from one or more video-on-demand sources that are outside IPTV system 100, such as movie studios and programmers of non-live content. VOD importer server 138 transmits the video-on-demand content to AQT switch 132, and AQT switch 132 communicates the material to CFT switch 112 via private network 104. The video-on-demand content is stored on VOD server 118. When a subscriber issues a request for VOD content to set-top box 153 through remote control 158, the request is transmitted over access network 102 to VOD server 118 via CFT switch 112. Upon receiving such a request, VOD server 118 retrieves the requested VOD content and transmits the content to set-top box or 153 across access network 102 via CFT switch 112.

OM tier 140 includes an OM tier (OMT) switch 142, a TV2 server 144, the OSS/BSS server 146, and a simple network management protocol (SNMP) monitor server 148. OMT switch 142 manages the communication between OM tier 140 and public network 106. OMT switch 142 is coupled to TV2 server 144, OSS/BSS server 146, and SNMP monitor server 148 that monitors network devices. TV2 server 144 receives television content from live acquisition server 134, or video-on-demand content from VOD importer server 138 through public network 106. The television and video-on-demand content is sent by TV2 server 144 to OMT switch 142 and forwarded to a subscriber of IPTV system 100 who accesses public network 106 through personal computer 108.

Figure 2:
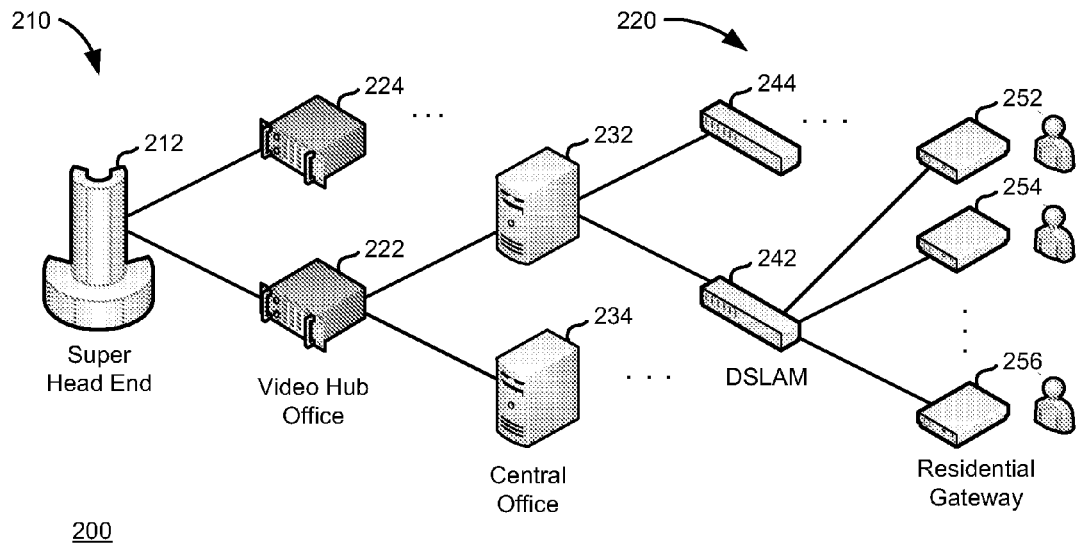
FIG. 2 is a block diagram illustrating an embodiment of a layered IPTV distribution network.

FIG. 2 illustrates an embodiment of a layered IPTV distribution network 200 similar to IPTV system 100. IPTV distribution network 200 includes a transport network 210 similar to private network 104, and an access network 220 similar to access network 102. IPTV distribution network 200 provides fiber-to-the-neighborhood (FTTN) and/or fiber-to-the-home (FTTH) access to IPTV services including on-demand and real-time content streaming. Transport network 210 includes a super head end (SHE) server 212, video hub office (VHO) servers 222 and 224, and central office servers 232 and 234. SHE server 212 functions to receive and store content for distribution within IPTV distribution network 200, and handles national level content management. SHE server 212 functions to prepare content for distribution, as for example by converting content received in an analog stream into a codec suitable for distribution via IPTV, and to manage digital rights to the content for IPTV distribution network 200. SHE server 212 distributes copies of the content to one or more regions in transport network 210. The content provided by IPTV distribution network 200 can include real-time or on-demand television programming, on-demand movie or event content, audio content, web content, or other forms of content.

VHO servers 222 and 224 are placed in particular locations to provide regional storage and distribution of the content received from SHO server 212. Thus, for example, a large metropolitan area can be served by VHO server 222, and a different metropolitan area can be served by VHO 224. VHO servers 222 and 224 pass through the real-time content and store the on-demand content received from SHE server 212. VHO servers 222 and 224 receive user requests for real-time content and satisfy these requests by passing through the requested real-time content to the requesting users. VHO servers 222 and 224 also receive user requests for on-demand content, and satisfy these requests by streaming the requested on-demand content to the requesting users. If the requested content is not stored on VHO servers 222 and 224, VHO servers 222 and 224 will request the content from SHE server 212. In a particular embodiment, VHO servers 222 and 224 are similar to VOD server 118 in IPTV system 100.

The metropolitan area served by VHO server 222 includes one or more central office servers 232 and 234, and the metropolitan area served by VHO server 224 includes one or more central office servers (not illustrated). Central office servers 232 and 234 are placed in locations to provide area wide distribution of the content received from VHO server 222. Thus, for example, central office 232 can distribute content to the north side of the metropolitan area, and central office 234 can distribute content to the south side of the metropolitan area.

Access network 220 includes the local area served by central office 232 and 234. Access network 220 includes one or more digital subscriber line access multiplexers (DSLAMs) 242 and 244 that are associated with the local area served by central office 232 and one or more DSLAMs (not illustrated) that are associated with the local area served by central office 234. DSLAMs 242 and 244 are placed in locations to provide local distribution of the content received from central office 232. For example, DSLAMs 242 and 244 can each distribute content to different neighborhoods in the north side of the metropolitan area served by VHO server 222. DSLAM 242 functions to provide twisted-pair copper wire VDSL service to one or more local RGs 252, 254, and 256, and DSLAM 244 functions to provide twisted-pair copper wire VDSL service to one or more local RGs (not illustrated). DSLAMs 242 and 244 typically provide VDSL service to up to 102 subscribers. Note that RGs 252, 254, and 256 are each associated with a particular subscriber, and that the subscribers have their own CPE (not illustrated) to receive the content.

Figure 3:
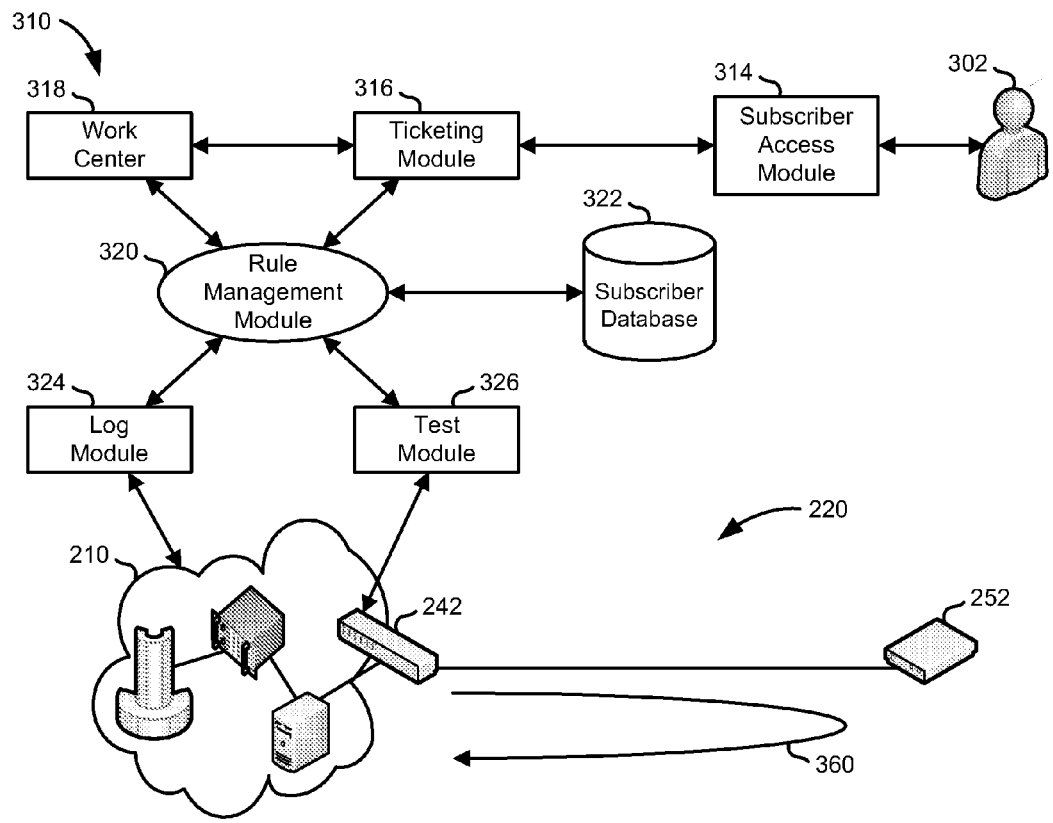
FIG. 3 is a block diagram illustrating an embodiment of a service assurance system in the IPTV distribution network of FIG. 2.

FIG. 3 illustrates a portion of IPTV distribution network including a service assurance system 310 that is connected to transport network 210 and to access network 220. Service assurance system 310 includes a subscriber access module 314, a ticketing module 316, a work center 318, a rule management module 320, a subscriber database 322, a performance monitoring module 324, and a test module 326. Service assurance system 310 provides management of the overall performance and reliability of IPTV distribution network 200. As such, service assurance system 310 provides a way to address fault conditions in IPTV distribution network 200. The fault conditions can be detected by an operator of IPTV distribution network 200, or by a subscriber 302 to the IPTV distribution network. A non-limiting example of a fault condition includes poor audio or video quality, loss of service, loss of channels, slow or no broadband connection, another fault condition, or a combination thereof.

Subscriber 302 communicates with subscriber access module 314 to describe a fault condition associated with the subscriber's CPE. Subscriber access module 314 allows subscriber 302 to describe the fault condition using a fully automated method, a partially automated method, or by interacting with a customer service representative (not illustrated). Subscriber access module 314 is connected to ticketing module 316. Ticketing module 316 operates to receive information related to the fault condition described by subscriber 302 and to generate a tracking ticket for the fault condition. Ticketing module 316 also operates to track and update the progress of the ticket, and to close the ticket when the fault condition is identified and corrected. Ticketing module 316 is connected to work center 318 and to rule management module 320. Work center 318 includes personnel to receive the ticket, diagnose the fault condition experienced by subscriber 302, dispatch a technician to a portion of IPTV distribution network 200, perform suitable service to the portion of the IPTV distribution network, or the like.

Rule management module 320 is connected to subscriber database 322, performance monitoring module 324, and test module 326. Rule management module 320 accesses subscriber database 322 to determine whether subscriber 302 is a current subscriber or is authorized to receive a particular service. If not, rule management module 320 can provide subscriber 302 with information that directs the subscriber to an appropriate mechanism to become a current subscriber or to receive the particular service. For example, if subscriber 302 is accessing subscriber access module 314 via a telephone, rule management module 320 can direct the subscriber to a customer service representative to establish a new account, or to modify an existing account. However, if subscriber 302 is accessing subscriber access module 314 via a web page interface, rule management module 320 can direct the subscriber to a web page with various sign-up options.

Rule management module 320 determines a cause of the fault condition. For example, rule management module 320 can determine the cause of the fault condition by correlating the fault condition to known service parameters, alarms, maintenance events, test results, other conditions on IPTV distribution network 200, or a combination thereof. Performance monitoring module 324 includes entries for the fault conditions, alarms, maintenance events, test results, and other events on transport network 210, access network 220, or subscriber's 302 CPE. Maintenance events include preventive maintenance, scheduled or unscheduled maintenance, upgrades for hardware, software, firmware, other maintenance events, or a combination thereof.

Rule management module 320 can also determine the cause of the fault condition by isolating the source of the fault condition to a particular portion of transport network 210, access network 220, or the CPE. For example, rule management module 320 can send instructions to devices within transport network 210, access network 220, and at the customer premises. The instructions can direct the devices to provide status information that is entered into performance monitoring module 324. The instructions can also direct the devices to perform test procedures and provide the test results to performance monitoring module 324. Test module 326 includes logic, hardware, other suitable equipment, or a combination thereof to perform the test procedures on the devices and to receive the test results. Rule management module 320 also generates instructions to be given to subscriber 302 to perform procedures that can help to isolate the cause of the fault condition, particularly when the cause resides in the access network or in the CPE, or a combination thereof.

Test module 326 is connected to DSLAM 242. Test module 326 directs DSLAM 242 to perform various self tests to determine the operational status of the DSLAM, and to return the results of the self tests to the test module. Test module 326 also directs DSLAM 242 to test the connection between the DSLAM and RG 252, and to return the results to the test module. For example, DSLAM 242 can test the connection by performing a test on loop 360 of a transmission loop between the DSLAM and RG 252, as described below. Test module 326 also provides instructions to DSLAM 242 to direct RG 252 to perform various tests and to return the results to the test module. The testing performed by RG 252 includes self tests that determine the operational status of the RG, and tests that determine the operational status of the CPE. In general, the test results provided by DSLAM 242 and RG 252 can be clean or dirty. A dirty result is broadly construed to mean that no measurement result can be taken, that a measurement of a performance monitoring alert limit or a control limit exceeds a pre-set limit, an indeterminate test result is obtained where the test result is not clearly a pass or a fail, where an error or fault condition is reported, another abnormal result is obtained, or a combination thereof. A clean result is construed to mean an absence of a result that is characterized as dirty. In a particular embodiment (not illustrated), test module 326 is also connected to DSLAM 244, central offices 232 and 234, VHOs 222 and 224, and SHE 212.

Figure 4:
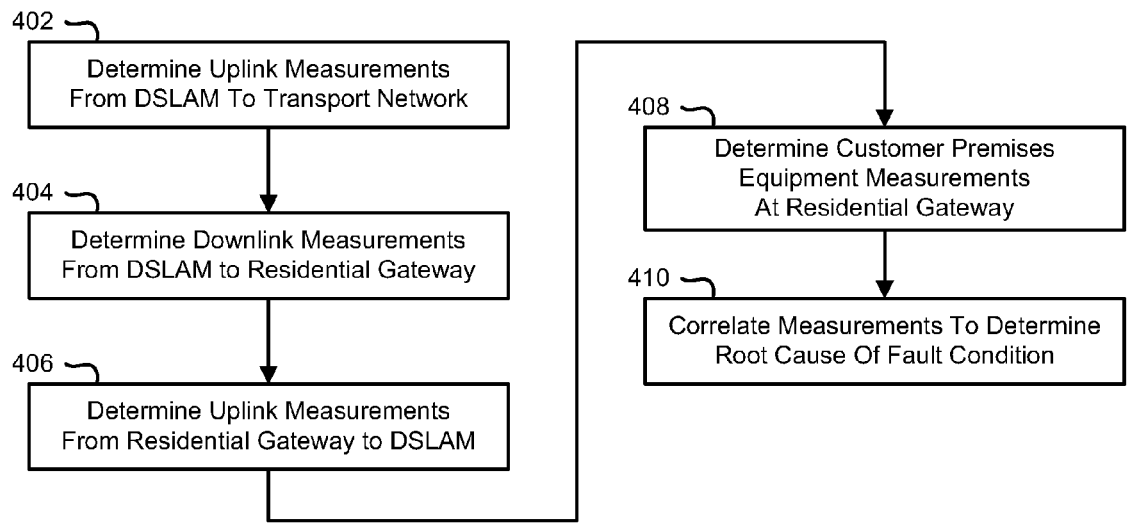
FIG. 4 is a flowchart illustrating an embodiment of a method of diagnosing a fault condition in the IPTV distribution network of FIG. 2.

FIG. 4 is a flowchart illustrating an embodiment of a method of diagnosing a fault condition when the cause of the fault condition has been isolated to access network 220. The method starts in block 402 by determining test measurements for uplink traffic from a DSLAM to a transport network. For example, DSLAM 242 can perform a test to determine if the uplink traffic to transport network 210 is clean or dirty, and can return the test result to test module 326. Test measurements for downlink traffic from the DSLAM to an RG are determined in block 404. For example, DSLAM 242 can perform a test to determine if the downlink traffic to RG 252 is clean or dirty, and can return the test result to test module 326. Test measurements for uplink traffic from the RG to the DSLAM, also referred to as Wide-Area Network (WAN) testing, are determined in block 406. For example, DSLAM 242 can direct RG 252 to perform a WAN test to determine if the uplink traffic is clean or dirty, and can return the test result to test module 326. Test measurements for downlink traffic from the RG to a set of CPE, also referred to as Local-Area Network (LAN) testing, are determined in block 408. For example, DSLAM 242 can direct RG 252 to perform a LAN test to determine if the downlink traffic is clean or dirty, and can return the test result to test module 326. The measurements taken in blocks 402 through 408 are correlated to determine a root cause of the fault condition in block 410.

TABLE-US-00001 TABLE 1 Fault Diagnosis in an Access Network Fault Measurements Uplink Downlink WAN LAN Root Cause Dirty Clean Clean Clean DSLAM Clean Dirty Dirty Clean Transmission Loop Clean Clean Dirty Clean Residential Gateway Clean Clean Clean Dirty CPE other than RG Table 1 illustrates an example of fault diagnosis in an access network for determining a root cause of a fault condition, as determined in block 410. The fault measurements as determined in blocks 402 through 408 are given in the "Fault Measurement" columns and are individually labeled "Uplink," "Downlink," "WAN," and "LAN." The column labeled "Root Cause" provides an element of the access network that is the root cause for each associated set of fault measurements. Thus, when the uplink measurement is dirty and the downlink, WAN, and LAN measurements are clean, the root cause of the fault condition is in the DSLAM under test. Similarly, when the downlink and WAN are dirty and the uplink and LAN are clean, the root cause is in the transmission loop. When the WAN is dirty and the uplink, downlink, and LAN are clean the root cause is in the RG. Finally, when the LAN is dirty and the uplink, downlink, and WAN are clean the root cause is in the CPE at a device other than the RG.

In another embodiment, preventive maintenance testing is conducted by the operator of IPTV distribution network 200 on a particular subsection of the network. For example, RGs 252, 254, and 256 can be set to a test mode that provides the of maximum bit rates for the data communicated from DSLAM 245 to the RGs, the downstream bit rate, and from the RGS to the DSLAM, the upstream bit rate. Bit rates are typically measured in bits per second. Table 2 illustrates exemplary results of preventive maintenance testing to determine the maximum downstream and upstream bit rates between a DSLAM and a group of connected RGs. The first column identifies a particular port of the DSLAM for the given test results. Note that the port is equivalently identified with the particular RG connected to the port. The second column gives the estimated loop length, as determined when the service to the RG is established. The third and fifth columns give the measured maximum downstream and upstream bit rates, respectively. The fourth and sixth columns give a percentile ranking of the measured bit rates for the downstream and upstream bit rates, respectively. The percentile ranking is a measure of the relative performance of the loop under test, as compared to the performance of other loops of similar length. Thus for example, the RG connected to port 256 has a maximum downstream bit rate of 50,747 bits per second, placing its performance in the bottom quartile of loops of a similar length. Here, rule management module 320 can select port 256 for further testing to determine if the loop needs maintenance or service. Note that the ranking can be made more or less granular as needed or desired, and that the level of performance that triggers additional testing can be adjusted as the workload in service assurance system 310 varies.

TABLE-US-00002 TABLE 2 Max Bit Rate Testing Max Down-Max Port Loop stream Upstream (RG) Length Bit Rate Ranking Bit Rate Ranking 252 2067 45,017 25% to 50% 6,526 50% to 75% 254 1650 52,656 75% to 100% 6,836 50% to 75% 256 1213 50,747 0% to 25% 6,303 25% to 50% 258 974 54,815 50% to 75% 7,108 75% to 100%

The performance of VDSL service on IPTV distribution network 200 depends on the bandwidth requirements of subscriber 302 and on the length of the transmission loop that is the physical distance between DSLAM 242 and RG 252. Generally, the bandwidth varies inversely with the transmission loop length. Further, VDSL service performance can be affected by a bridged tap in the transmission loop. A bridged tap is any unterminated portion of a transmission loop that is not in the direct path between DSLAM 242 and RG 252. Generally, the further away a bridged tap is from RG 252, the better VDSL performance. Also, the VDSL performance can depend on the length of the bridged tap. Other faults in the transmission loop can also affect VDSL service performance, such as where portions of the transmission loop are submerged in water. Thus, in a particular transmission loop, a detailed knowledge of the length of the transmission loop, the existence, location, and length of any bridged taps, and the existence and location of other fault conditions is useful to service assurance system 310.

Double-ended loop testing (DELT) is a method of frequency-domain reflectometry (FDR) wherein a swept frequency signal is transmitted on the transmission loop, and a detector at the loop end detects the transmitted signal. In a particular embodiment, the transmission loop is described as a two-port network, and the characteristics of the frequency-dependent attenuation are calculated using a forward transmission matrix. Here, the transfer function for the transmission loop is given as:

$$H(f)=ZL(A*ZL)+B+(C*ZL*ZS)+(D*ZS) \quad \text{Equation 1\#\#EQU00001\#\#}$$

where H(f) is the magnitude of the loop attenuation for a given frequency f, $Z_S$ is the source impedance, $Z_L$ is the load impedance, and A, B, C, and D are the transmission line parameters given as:

$$A=V2(f)V1(f); B=V2(f)I1(f); C=I2(f)V1(f); \text{and } D=I2(f) I1(f). \quad \text{Equation 2\#\#EQU00002\#\#}$$

Calculating H log(f) as:

$$H\log(f)=20*\log_{10}|H(f)| \quad \text{Equation 3}$$

it is possible to obtain an impulse response for the transmission loop in the time domain by applying an inverse fast-Fourier transform (FFT). The total length of the transmission loop is then calculated by identifying the travel time of the impulse.

The length of the transmission loop, the existence, location, and length of any bridged taps, and the existence and location of other fault conditions is determined based on finding a minimum chi-square fit of the transmission line parameters. The chi-square is given as:

$$\chi^2 = \text{toneIDWeight(toneID)}*[H\log\_m(\text{toneID})-H\log\_f(\text{toneID})]2\text{number\_of\_tones} \quad \text{Equation 4\#\#EQU00003\#\#}$$

where H log_m is the measured value, H log_f is the fitted value, and $\chi^2$ is calculated for each transmission loop and tap combination. The transmission loop and tap lengths are scanned and the fitted transmission loop and tap lengths are found when the minimum $\chi^2$ is found. However, finding the minimum $\chi^2$ is a processor intensive method that is not generally suitable for real time applications.

Thus, in a particular embodiment, in order to simplify the processing, several fitting techniques are employed to determine the transmission loop and tap lengths. For example, the signal loss caused by the transmission loop and the taps can be calculated separately, providing an approximation of the attenuation, such that:

$$H\log(\text{toneID,loop\_length,tap\_length})=H\log(\text{toneID, loop\_length})+H\log(\text{toneID,tap\_length}). \quad \text{Equation 5}$$

Further, losses due to a transmission loop and a tap in different tones with different transmission loop lengths can be pre-calculated and saved to a file. Thus, for example the loss from a tap can be approximated to be equivalent to the loss of a transmission loop of 10 feet with a tap of a certain length. The pre-calculated values can be read when the estimation is started, and the loop attenuation with the tap is thus approximated to be the attenuation without a tap plus the attenuation of the tap.

Another fitting technique is to constrain the scanning step lengths, rather than to scan for all possible lengths. For example, loop lengths can be scanned in 25 foot increments for transmission loops between 100 and 6000 feet. Tap lengths can be scanned in 2 foot increments for taps between 10 and 40 feet, in 3 foot increments for taps between 40 and 100 feet, in 10 foot increments for taps between 100 and 300 feet, in 20 foot increments for taps between 300 and 800 feet, and in 25 foot increments for taps between 800 and 2000 feet. Also, the length of the transmission loop can be scanned over less than the entire range of 100 to 6000 feet. For example, the scan can start at the longest possible transmission loop length and end at the shortest possible transmission loop length, as determined by the individual tones. In a particular embodiment, the scan starts at the longest possible transmission loop length, plus 200 feet.

The weight of each tone in the chi-square calculation can be pre-calculated. Further, H log data that shows extra loss in the lower frequency tones can indicate that a coaxial and diplexers are present in the CPE. The losses due to the presence of a coaxial and diplexers should be subtracted before entering the fit. Here, the losses due to a coaxial and diplexers can be pre-calculated and saved to a file. The pre-calculated values can be read when the estimation is started. Also, by finding local minimums and maximums in the H log curve, the presence of a fault or a tap can be determined. For example, a local minimum can be identified as a dip of at least 0.5 dB over a width of at least 20 carriers, and a local maximum can be identified as a peak of at least 0.5 dB over a width of at least 20 carriers.

Single-ended loop testing (SELT) is a method of frequency-domain reflectometry (FDR) wherein a swept frequency signal is transmitted on the transmission loop, and a detector at the transmitting end detects both the transmitted signal and the signals reflected from the transmission loop end and any bridged taps or faults. In a particular embodiment, SELT per tone echo data is processed with an FFT to obtain a time-domain reflectometry (TDR) trace to measure the length of the transmission loop, to determine the presence of any bridged taps or faults, and to determine the lengths of any bridged taps. Here, the loop and tap lengths can be estimated based on the measured loop attenuation at different tones. However, very short taps, such as a tap that is shorter than about 50 feet, and very long taps, such as a tap that is longer than about 900 feet can be difficult to identify. The time domain trace of the reflection signal strength f(j) is determined as:

$$f(j) = i=1 \text{MaxCarriers}(a_i \cos 2.pi.ijL + b_i \sin 2.pi.ijL) \quad \text{Equation 6}$$

where $a_i$ and $b_i$ are the SELT test reflections for each selected carrier frequency i. In a particular embodiment, the carriers are determined as i*4.3125 kilo Hertz. The distance associated with each value is given as:

$$\text{distance}(j) = \text{step\_size}*j + \text{offset} \quad \text{Equation 7}$$

where the offset value is a calibrated value for the particular test equipment used. The SELT trace is plotted as f(j) versus distance(j). The step size is a function of the number of carriers used in the FFT. As such:

$$\text{step\_size} = f(\text{Max.Carriers}). \quad \text{Equation 8}$$

Note that in this algorithm, the maximum number of carriers Max.Carriers is a function of the loop length L such that:

$$\text{Max.Carriers} = f(L). \quad \text{Equation 9}$$

In this way, the resolution of the FFT signal f(j) is improved.

Figure 5:
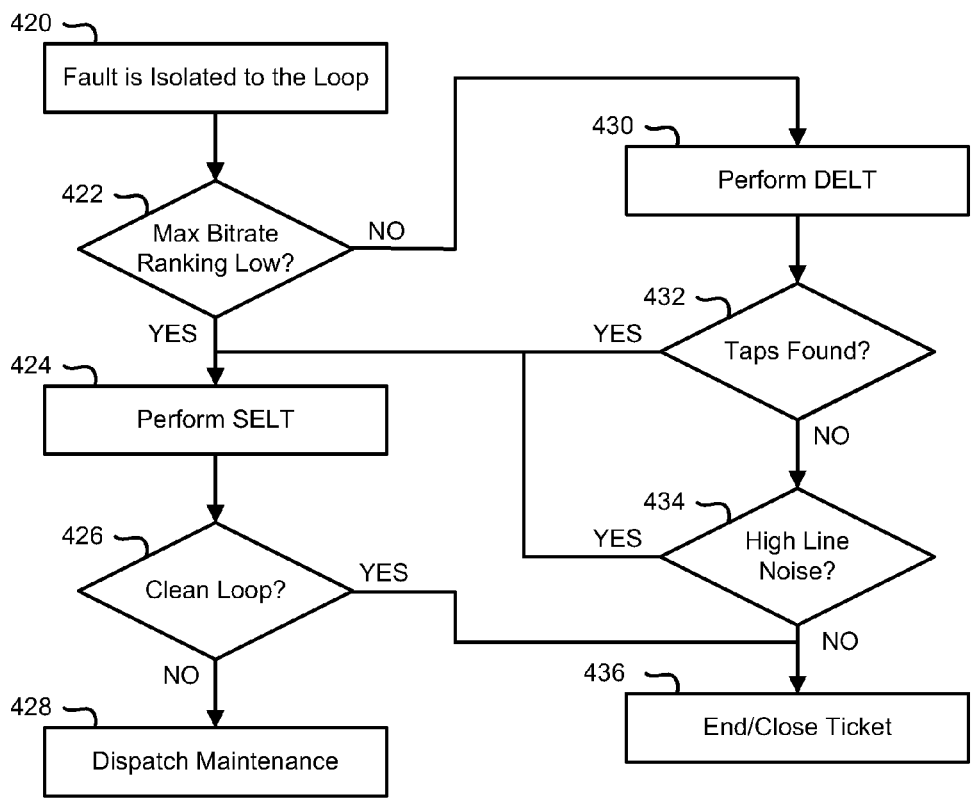
FIGS. 5 and 6 are block diagrams illustrating a single-ended loop test set-up for testing a transmission loop between a digital subscriber line access multiplexer and a residential gateway.
Figure 6:
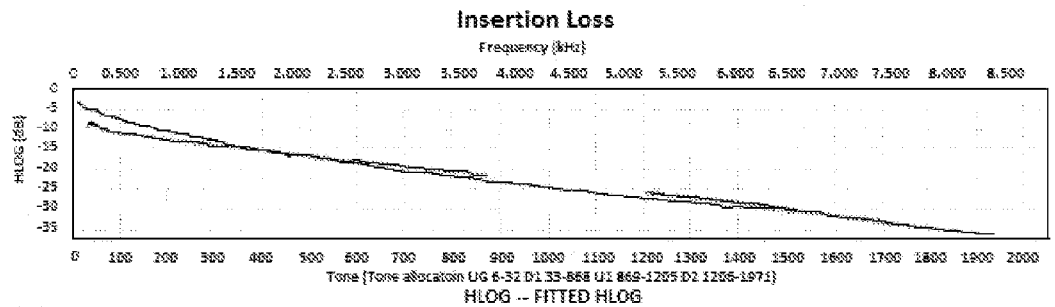
Figure 7:
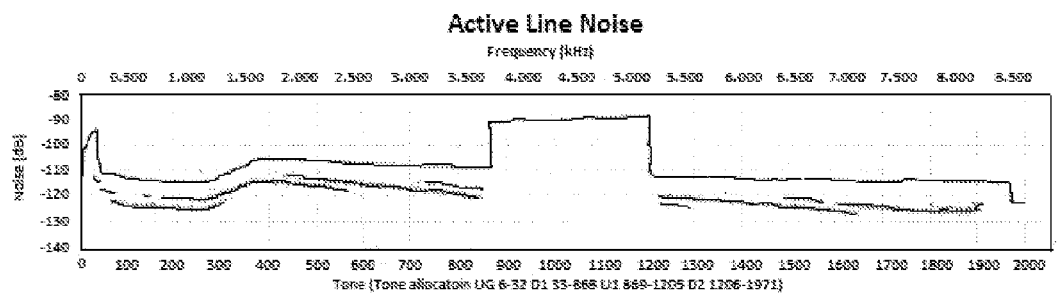
FIGS. 7 and 8 are graphs illustrating response traces obtained from the single-ended loop test set-up of FIGS. 5 and 6.

FIG. 5 is a flowchart illustrating an embodiment of a method of diagnosing a fault condition when the cause of the fault condition has been isolated to a particular loop in an access network. The method begins in block 420 where a fault is isolated to a particular loop. For example, a subscriber 302 can call in a problem that is isolated to loop 360 through a fault diagnostic method similar to the method of FIG. 4, or the loop can be identified as having a low maximum bit rate ranking, as describe with respect to Table 2, above. A decision is made as to whether or not the maximum bit rate ranking is low in decision block 422. If not, then the maximum bit rate testing has not indicated a problem with the particular loop, and so the "NO" branch of decision block 422 is taken, and DELT testing is performed in block 430. For example, a DELT test can provide an insertion loss result as shown in FIG. 6. Here the actual H log data closely matches the expected H log curve, without showing any ripple. A DELT test can also provide a line noise result as shown in FIG. 7. Here the actual line noise is consistently less than the expected line noise. A decision is made in block 432 as to whether or not taps are found with the DELT test results. For example, the H log result in FIG. 6 shows no indication of the presence of taps since there is no ripple in the result. The presence of a tap will be accompanied by an H log result with a noticeable ripple, as described below. If no taps are found with the DELT test results, the "NO" branch of decision block 432 is taken, and a decision is made as to whether or not the DELT test result indicates high line noise in block 434. For example, the line noise result in FIG. 7 shows no indication of high line noise since the actual line noise is below the expected line noise. The presence of high line noise will be accompanied by actual line noise measurements that are higher than the expected line noise. If the DELT test result does not indicate high line noise, the "NO" branch of decision block 434 is taken, and the method ends in block 436. If the testing was performed pursuant to a trouble ticket being generated, then the trouble ticket is also closed in block 436.

If the maximum bit rate ranking is low in decision block 422, then the maximum bit rate testing has indicated a problem with the particular loop, and so the "YES" branch of decision block 422 is taken, and SELT testing is performed in block 434. Also, if either taps are found with the DELT test results and the "YES" branch of decision block 432 is taken, or the DELT test result indicates high line noise and the "YES" branch of decision block 434 is taken, then SELT testing is performed in block 434. The method and results of SELT testing are described below. A decision is made as to whether or not the SELT test results indicate a clean loop in decision block 426. If the loop is clean, the "YES" branch of decision block 426 is taken, and the method ends in block 436. If the loop is not clean, the "NO" branch of decision block 426 is taken, and a maintenance order is generated to dispatch a maintenance technician to repair the loop in block 426.

Figure 8:
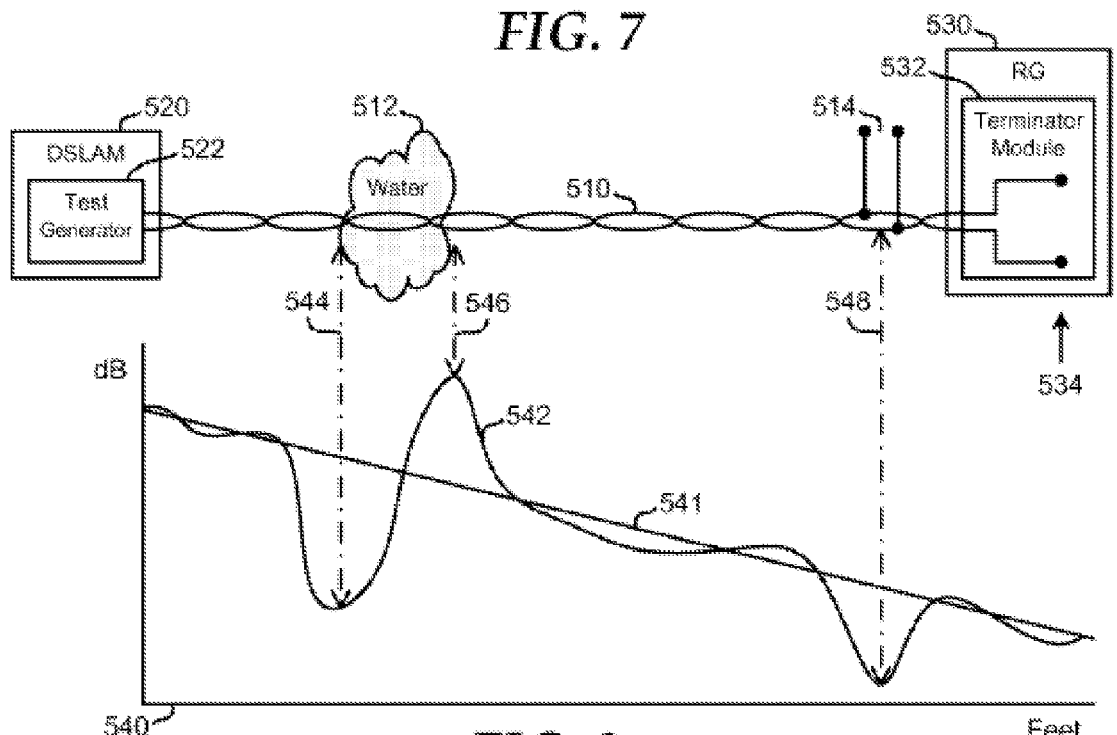
Figure 9:
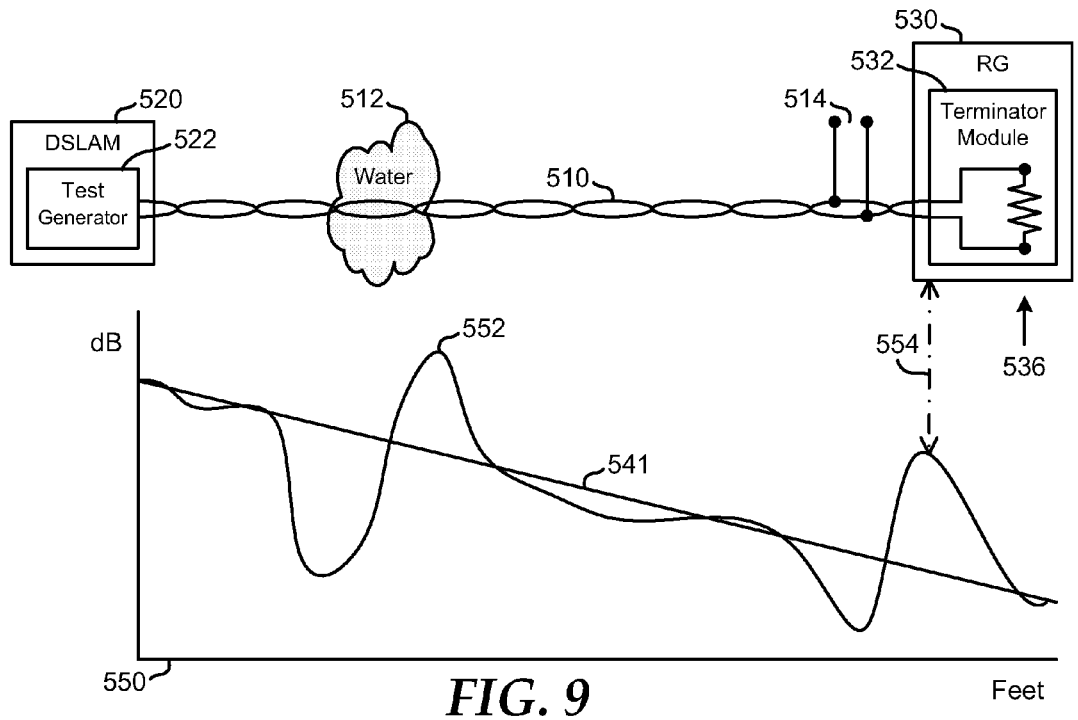
FIG. 9 is a flowchart illustrating an embodiment of a method of diagnosing a transmission loop in the service assurance system of FIG. 3.

FIGS. 8 and 9 illustrate a SELT set-up for testing a transmission loop 510 between a DSLAM 520 and an RG 530. Transmission loop 510 includes a fault 512, where the transmission loop is submerged under water, and a tap 514. DSLAM 520 includes a test generator 522 operable to transmit a swept frequency signal on transmission loop 510 and to detect the swept frequency signal and the signals reflected from the transmission loop. RG 530 includes a terminator module 532 operable to configure transmission loop 510 in an open-loop configuration 534 or to terminate the transmission loop in a terminated-loop configuration 536. In a particular embodiment, a test module (not illustrated) similar to test module 326 directs test generator 522 to perform an open-loop SELT, illustrated in FIG. 8, or a terminated-loop SELT, illustrated in FIG. 9. DSLAM 520 then directs terminator module 532 to configure transmission loop 510 as either an open-loop configuration or a terminated-loop configuration. In another embodiment, the test module directs terminator module 532 to configure transmission loop 510 as either an open-loop configuration or a terminated-loop configuration, and then directs DSLAM test generator 522 to perform a SELT.

FIG. 8 also illustrates a graph 540 including a response trace 542 for an open-loop SELT on transmission loop 510. Response trace 542 includes echoes 544 and 546 corresponding to the location on transmission loop 510 where the transmission loop enters and leaves fault 512, and echo 548 corresponding to the location on the transmission loop of tap 514. Note that response trace 542 generally decreases with distance, resulting from an attenuation of the signal with distance that corresponds with an expected attenuation 541. FIG. 9 also illustrates a graph 550 including a response trace 562 for a terminated-loop SELT on transmission loop 510. Response trace 552 includes echoes for fault 512 and tap 514 (not indexed), and for the location of the loop end 554. Note that response trace 552 also decreases with expected attenuation 541.

Figure 10:
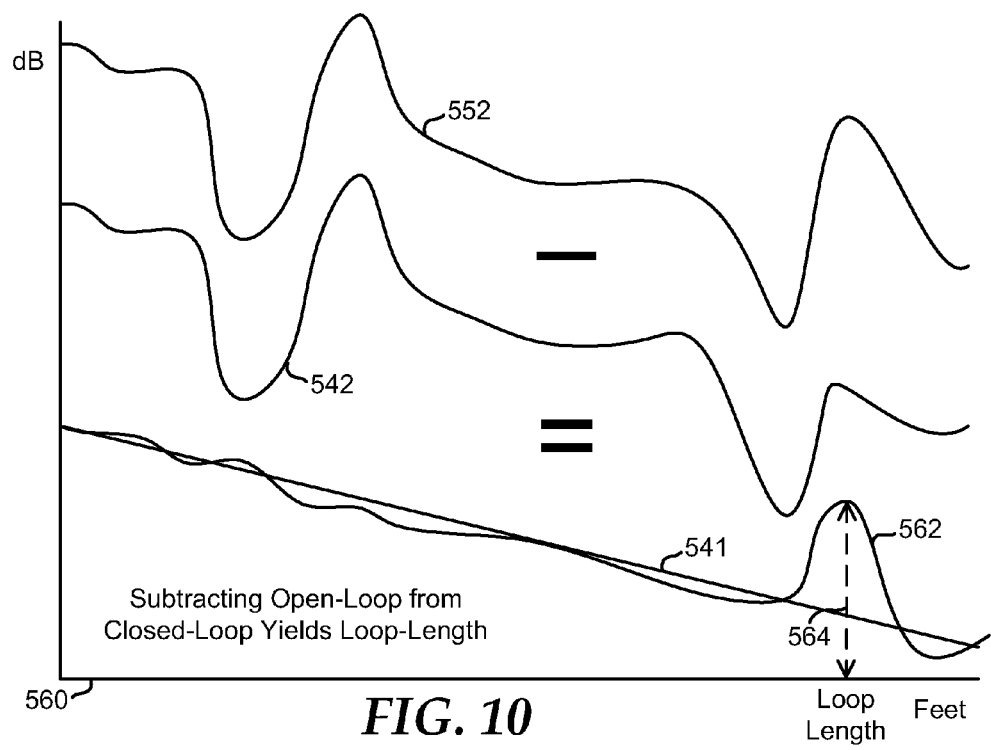
FIG. 10 is a block diagram showing an illustrative embodiment of a general computer system.

FIG. 10 illustrates a graph 560 showing a method of determining the length of transmission loop 510. Note that open-loop response trace 542 includes reflections from fault 512 and from tap 514, but not from open-loop 534. Further, terminated-loop response trace 552 includes reflections from fault 512, from tap 514, and from terminated-loop 536. Thus, by subtracting open-loop response trace 542 from terminated-loop response trace 552, the reflections from fault 512 and tap 514 are cancelled, leaving the reflection from terminated-loop 536. The resulting loop-end trace 562 indicates the length 564 of transmission loop 510.

Figure 11:
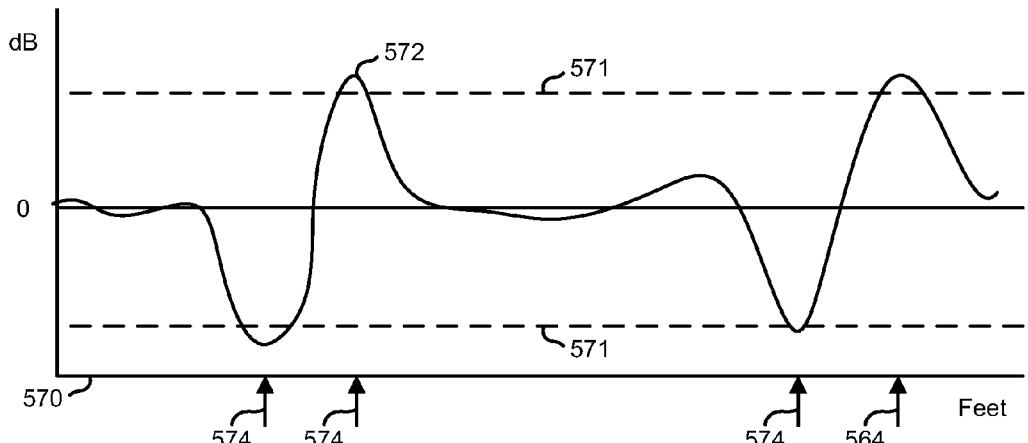
FIG. 11 illustrates a graph including an attenuation compensated terminated-loop response trace.

FIG. 11 illustrates a graph 570 including an attenuation compensated terminated-loop response trace 572. Compensated response trace 572 is similar to terminated-loop response trace 552. However, compensated response trace 572 except that the effects of expected attenuation curve 541 have been removed, providing a flatter response for the compensated response trace 572 than for terminated-loop response trace 552. Also note that the amplitude of the echoes in terminated-loop response trace 552 decreases the further away the source of the echo is from DSLAM 220. Thus compensated response trace 572 also compensates for the amplitude degradation, and the echoes are similar in amplitude. Finally note that compensated response trace 572 is normalized to 0 dB. In this way, a threshold 571 can be set for detection of faults and taps at locations 574, and the loop end at location 564. Setting a higher limit for threshold 571 results in a lower detection rate, but also yields a lower false detection rate. In contrast, setting a lower limit for threshold 571 results in a higher detection rate, but also yields a higher false detection rate.

Noise on transmission loop 510 is generated randomly by loop 510, test generator 522, and terminator module 532, and is not attenuated with distance. Thus echoes from more distant faults or taps become less distinguishable from noise, and accurate detection becomes more difficult. In a particular embodiment (not illustrated), baseline noise on transmission loop 510 is modeled using a low order polynomial algorithm that is fitted to the length of the transmission loop as determined in FIG. 7, and the fitted baseline noise is subtracted from compensated response trace 572 to improve the detection of distant faults and taps.

Referring to FIG. 3, note that performing SELT is intrusive on the connection between DSLAM 242 and RG 252. Thus subscriber 302 will be unable to receive IPTV content while SELT is being conducted. Thus, if rule management module 320 determines that SELT testing is necessary to determine the root cause of the fault condition, then the rule management module can provide for subscriber access module 314 to inform subscriber 302 to expect a service interruption for the duration of the SELT testing. In another embodiment, subscriber access module 314 can provide subscriber 302 with optional times to schedule the necessary SELT testing, and the subscriber can select times when the subscriber is unlikely to desire access to the service, as for example in the middle of the night.

Figure 12:
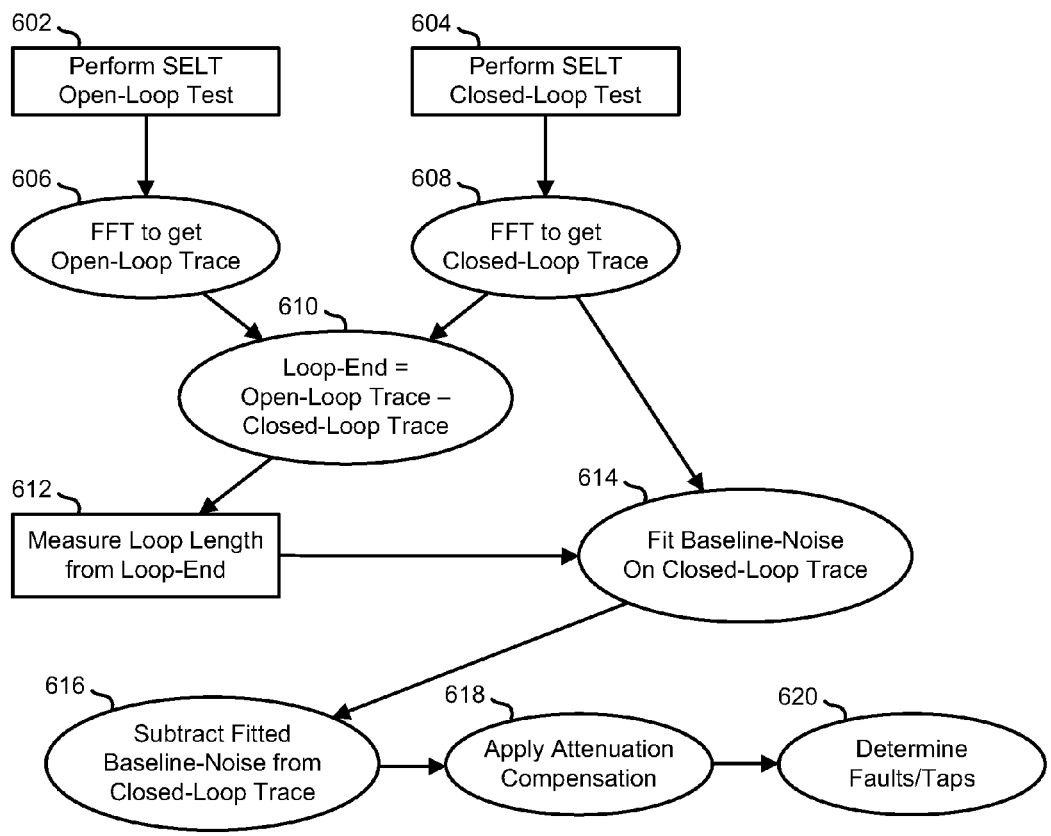
FIG. 12 is a flowchart illustrating an embodiment of a method of diagnosing a transmission loop in VDSL services to support service assurance systems on an IPTV system.

FIG. 12 is a flowchart illustrating an embodiment of a method of diagnosing a transmission loop in VDSL services to support service assurance systems on an IPTV system. A SELT open-loop test is performed in block 602, and a SELT terminated-loop test is performed in block 604. For example, test generator 522 can direct terminator module 532 to configure transmission loop 510 in an open-loop configuration 534, perform a SELT on the transmission loop, direct the terminator module to terminate the transmission loop in a terminated-loop configuration 536, and perform another SELT test. An FFT is performed on the result of the open-loop test to obtain an open-loop trace similar to open-loop response trace 542 in block 606, and an FFT is performed on the result of the terminated-loop test to obtain a terminated-loop trace similar to terminated-loop response trace 552 in block 608. Here test generator 522 or DSLAM 520 can perform the FFT, or the results of the open-loop and terminated-loop tests can be sent to a test module for the processing.

From this point in the method, processing can proceed at test generator 522, at DSLAM 520, at a test module, at another device or location, or at a combination thereof. The open-loop trace is subtracted from the terminated-loop trace to obtain a loop-end trace similar to loop-end trace 562 in block 610. The loop-end trace is analyzed to determine the length of the transmission loop in block 612. The length of the transmission loop is correlated to a baseline-noise model, and the fitted baseline-noise is combined with the terminated-loop trace in block 614. The fitted baseline-noise is subtracted from the terminated-loop trace in block 618. Attenuation compensation is applied in block 618 to obtain a compensated trace similar to compensated response trace 572 in block 618. The compensated trace is evaluated to determine the locations of the faults and taps on the transmission loop in block 620.

In another embodiment, not illustrated, after the length of the transmission loop is determined in block 612, a SELT close-loop test is redone with the correct transmission loop length from block 612, and an FFT is performed on the result to obtain a new terminated-loop trace. Here, it is the new terminated-loop trace that is combined with the baseline noise in block 614. In this way, the accuracy of the determinations of the positions and lengths of the taps, and the positions of the faults is improved. Table 3 illustrates the results from the SELT testing described in FIG. 12 and the responses thereto. If the SELT testing indicates a clean loop, then the ticket is closed with no further action. However, if the SELT testing indicates a bridged tap or definite opens or faults, then a technician is sent to verify the problems and make repairs as needed or desired. If the SELT testing indicates minor faults or no clear conclusion, the ticket is sent to an appropriate work center for further analysis and diagnosis.

Figure 13:
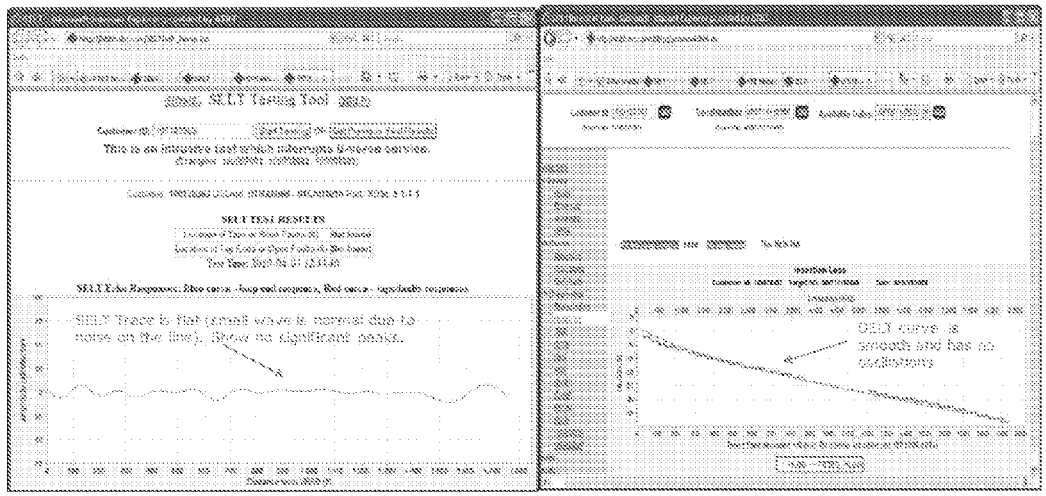
FIGS. 13-18 illustrate screen captures from test equipment for exemplary test results for various conditions found on a loop.
Figure 14:
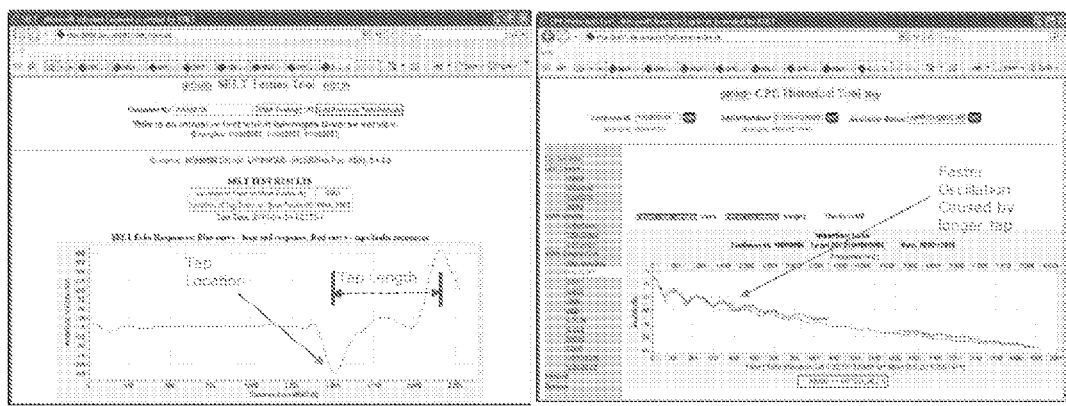
Figure 15:
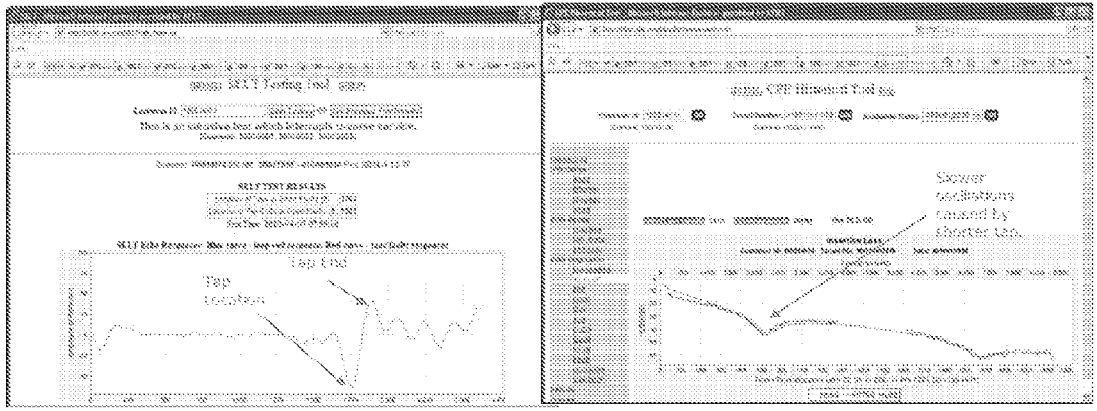
Figure 16:
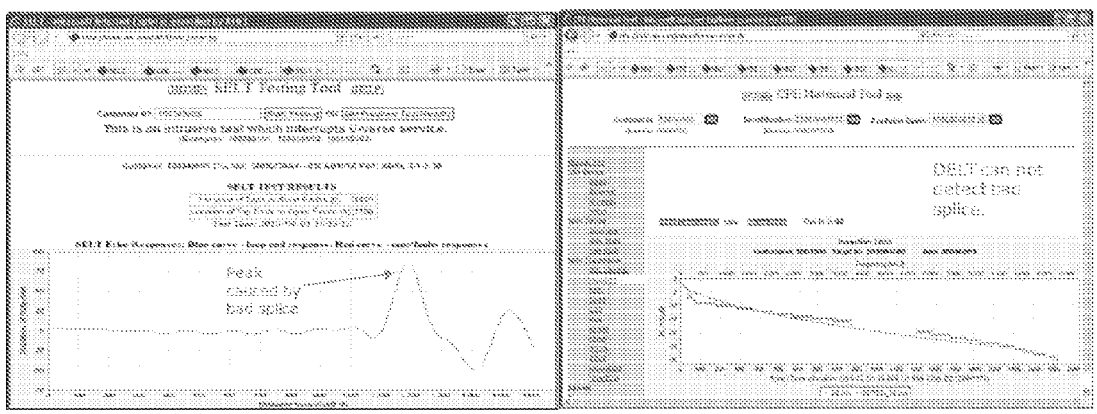
Figure 17:
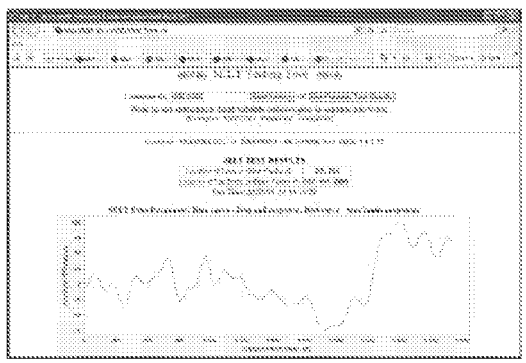
Figure 18:
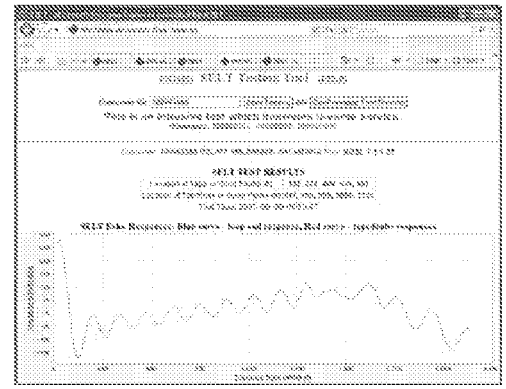

TABLE-US-00003 TABLE 3 SELT Test Results SELT Test Result Response Clean Loop Close Ticket Bridged Tap Send Technician to Verify/Repair Definite Opens or Faults Send Technician to Verify/Repair Minor Faults-Send to Work Center for Further Diagnosis No Clear Conclusion FIGS. 13-18 illustrate screen captures from test equipment for exemplary test results for various conditions found on a loop. FIG. 13 illustrates a clean loop where the SELT trace is flat without distinct peaks, and the DELT trace is smooth, showing no oscillations. FIG. 14 illustrates a long bridged tap where the SELT trace has distinct peaks revealing the location and length of the tap, and the DELT trace shows a rapid oscillation resulting from the tap. FIG. 15 illustrates a short bridged tap where the SELT trace has distinct peaks revealing the location of the tap and that the tap is relatively short, and the DELT trace shows a longer oscillation caused by the shorter tap. FIG. 16 illustrates an open fault caused by a bad splice, but the DELT trace is unable to reveal any information about the bad splice. FIG. 17 illustrates a messy loop with multiple small reflections on the SELT trace. This condition does not lend itself to easy diagnosis, so such a condition can be sent to a work center for further analysis. FIG. 18 illustrates radio frequency interference with the loop, as shown by the periodic oscillations superimposed on the SELT trace.

Figure 19:
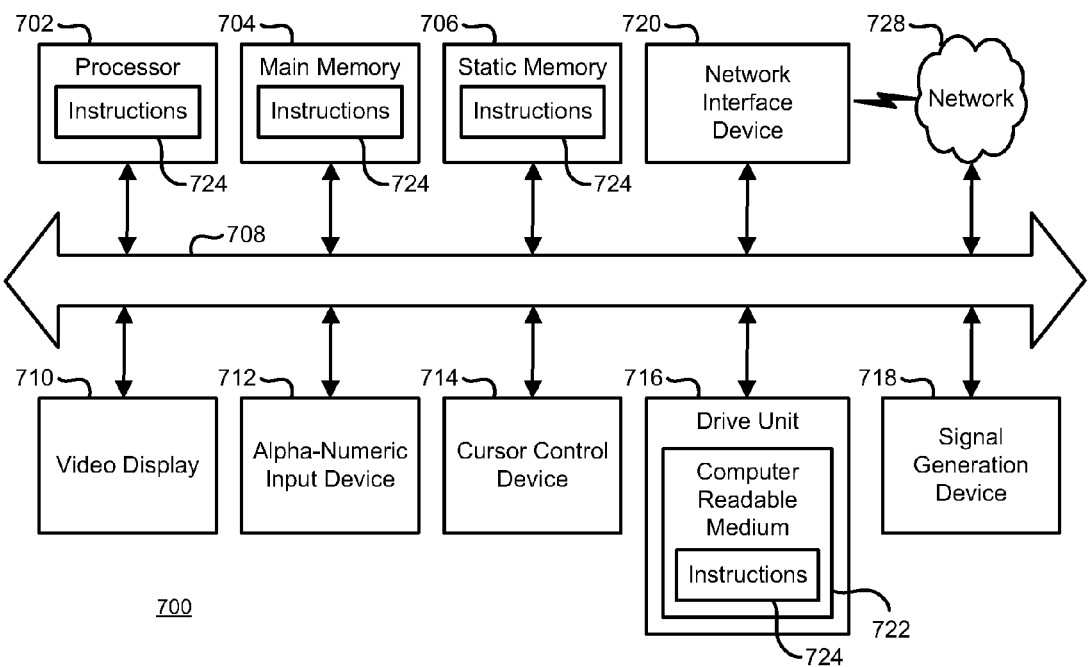
FIG. 19 shows an illustrative embodiment of a general computer system in accordance with at least one embodiment of the present disclosure.

FIG. 19 shows an illustrative embodiment of a general computer system 700 in accordance with at least one embodiment of the present disclosure. Computer system 700 includes a set of instructions that can be executed to cause computer system 700 to perform any one or more of the methods or computer based functions disclosed herein. Computer system 700 can operate as a standalone device or can be connected via a network to other computer systems or peripheral devices.

In a networked deployment, computer system 700 operates in the capacity of a server or as a client computer in a server-client network environment, or as a peer computer system in a peer-to-peer (or distributed) network environment. Computer system 700 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 700 is implemented using electronic devices that provide voice, video or data communication. Further, while computer system 700 is illustrated as a single system, the term "system" shall also be taken to include any collection of systems or sub-systems that individually or jointly execute a set, or multiple sets, of instructions to perform one or more computer functions.

Computer system 700 includes a processor 702 such as a central processing unit (CPU), a graphics processing unit (GPU), or both. Moreover, computer system 700 includes a main memory 704 and a static memory 706 that communicate with each other via a bus 708. Computer system 700 further includes a video display unit 710, such as a liquid crystal display (LCD), an organic light emitting diode (OLED), a flat panel display, a solid state display, or a cathode ray tube (CRT). Additionally, computer system 700 includes an input device 712, such as a keyboard, and a cursor control device 714, such as a mouse. Computer system 700 also includes a disk drive unit 716, a signal generation device 718, such as a speaker or remote control, and a network interface device 720.

In a particular embodiment, disk drive unit 716 includes a computer-readable medium 722 in which one or more sets of instructions 724 are embedded. Instructions 724 embody one or more of the methods or logic as described herein. In a particular embodiment, instructions 724 reside completely, or at least partially, within main memory 704, static memory 706, and/or within processor 702 during execution by computer system 700. Main memory 704 and processor 702 also include computer-readable media. Network interface device 720 provides connectivity to a network 726 such as a wide area network (WAN), a local area network (LAN), or other network. The present disclosure contemplates a computer-readable medium that includes instructions 724 or receives and executes instructions 724 responsive to a propagated signal, so that a device connected to network 726 can communicate voice, video or data over network 726. Further, instructions 724 can be transmitted or received by network 726 via network interface device 720.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. .sctn.1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A network server device, comprising:
a memory that stores computer instructions; and
a processor communicatively coupled to the memory wherein the processor, responsive to executing the computer instructions, performs operations comprising:
directing a network device to configure a transmission loop in an open-loop configuration, wherein a first end of the transmission loop terminates at a gateway device and a second end of the transmission loop terminates at the network device and wherein the network device directs the gateway device to configure the transmission loop to the open-loop configuration;
directing the network device to perform a first single-ended loop test of the transmission loop responsive to configuring the transmission loop to the open-loop configuration;
directing the network device to configure the transmission loop in a terminated-loop configuration, wherein the network device directs the gateway device to configure the transmission loop to the terminated-loop configuration; and
directing the network device to perform a second single-ended loop test of the transmission loop responsive to configuring the transmission loop to the terminated-loop configuration; and
directing the network device to subtract a first trace associated with the first single-ended loop test from a second trace associated with the second single-ended loop test to determine a third trace, wherein the third trace corresponds to a length of the transmission loop.

2. The network server device of claim 1, wherein the network device generates the first trace by a first fast-Fourier transform of the first single-ended loop test and generates the second trace by a second fast-Fourier transform of the second single-ended loop test.

3. The network server device of claim 2, wherein the processor further performs operations comprising directing the network device to determine a fitted baseline noise factor for the transmission loop based upon the length of the transmission loop and to subtract the fitted baseline noise factor from the third trace to obtain a fourth trace.

4. The network server device of claim 3, wherein the processor further performs operations comprising directing the network device to determine an attenuation compensation factor for the transmission loop based upon the length of the transmission loop and to apply the attenuation compensation factor to the fourth trace to obtain a fifth trace.

5. The network server device of claim 4, wherein the processor further performs operations comprising directing the network device to apply a threshold limit to the fifth trace and to determine a location of a fault or of a tap in the transmission loop based upon a location on the fifth trace, wherein an amplitude of the fifth trace exceeds the threshold limit.

6. The network server device of claim 1, wherein the network device comprises a digital subscriber line access multiplexer.

7. A residential gateway device, comprising:
a terminator module;
a memory to store computer instructions; and
a processor communicatively coupled to the memory and the terminator module, wherein the processor, responsive to executing the computer instructions, performs operations comprising:
receiving a first instruction from a network device of an access network;
directing the termination module to configure at a first end of a transmission loop an open-loop configuration responsive to the receiving of the first instruction, wherein the first end of the transmission loop terminates at the termination module, wherein a second end of the transmission loop terminates at the network device, and wherein the transmission loop provides a first communication link between the network device and the residential gateway device;
receiving a second instruction from the network device responsive to the access network performing a first single-ended loop test at the second end of the transmission loop with the first end of the transmission loop in the open-loop configuration; and
directing the terminating module to configure the first end of the transmission loop in a terminated-loop configuration responsive to receiving the second instruction, wherein the access network performs a second single-ended loop test at the second end of the transmission loop with the first end of the transmission loop in the terminated-loop configuration, and wherein the access network subtracts a first trace associated with the first single-ended loop test and a second trace associated with the second single-ended loop test to determine a third trace and wherein the third trace corresponds to a length of the transmission loop.

8. The residential gateway device of claim 7, wherein the access network performs the first single-ended loop test and the second single-ended loop test by way of the network device.

9. The residential gateway device of claim 7, wherein the access network generates the first trace by a first fast-Fourier transform of the first single-ended loop test and generates the second trace by a second fast-Fourier transform of the second single-ended loop test.

10. The residential gateway device of claim 7, wherein the access network determines a fitted baseline noise factor for the transmission loop based upon the length of the transmission loop and subtracts the fitted baseline noise factor from the third trace to obtain a fourth trace.

11. The residential gateway device of claim 10, wherein the access network determines an attenuation compensation factor for the transmission loop based upon the length of the transmission loop and applies the attenuation compensation factor to the fourth trace to obtain a fifth trace.

12. The residential gateway device of claim 11, wherein the access network applies a threshold limit to the fifth trace and determines a location of a fault or of a tap in the transmission loop based upon a location on the fifth trace, wherein an amplitude of the fifth trace exceeds the threshold limit.

13. The residential gateway device of claim 7, wherein the network device comprises a digital subscriber line access multiplexer.

14. The residential gateway device of claim 7, wherein the processor further performs operations comprising:
   establishing a second communication link between the residential gateway device and a set-top box device;
   receiving media content from the access network via the transmission loop; and
   transmitting the media content to the set-top box via the second communication link.

15. A method, comprising:
   receiving, by a residential gateway device comprising a processor, a first instruction from a network device of an access network;
   directing, by the residential gateway device, a termination module to configure at a first end of a transmission loop an open-loop configuration responsive to the receiving of the first instruction, wherein the first end of the transmission loop terminates at the termination module, wherein a second end of the transmission loop terminates at the network device, and wherein the transmission loop provides a first communication link between the network device and the residential gateway device;
   receiving, by the residential gateway device, a second instruction from the network device responsive to the access network performing a first single-ended loop test at the second end of the transmission loop with the first end of the transmission loop in the open-loop configuration; and
   directing, by the residential gateway device, the terminating module to configure the first end of the transmission loop in a terminated-loop configuration responsive to receiving the second instruction, wherein the access network performs a second single-ended loop test at the second end of the transmission loop with the first end of the transmission loop in the terminated-loop configuration, and wherein the access network subtracts a first trace associated with the first single-ended loop test and a second trace associated with the second single-ended loop test to determine a third trace and wherein the third trace corresponds to a length of the transmission loop.

16. The method of claim 15, wherein the access network performs the first single-ended loop test and the second single-ended loop test by way of the network device.

17. The method of claim 15, wherein the transmission loop provides a physical communication link for the access network to provide media content to a set-top box device by way of the residential gateway device.

* * * * *